(12) United States Patent
Forster

(10) Patent No.: US 6,568,827 B2
(45) Date of Patent: May 27, 2003

(54) MARKING ELEMENT FOR CARRIAGEWAYS

(75) Inventor: Michael Forster, Wattens (AT)

(73) Assignee: D. Swarovski & Co., Wattens (AT)

( * ) Notice: Subject to any disclaimer, the term of this patent is extended or adjusted under 35 U.S.C. 154(b) by 0 days.

(21) Appl. No.: 09/972,907

(22) Filed: Oct. 10, 2001

(65) Prior Publication Data

US 2002/0044444 A1 Apr. 18, 2002

(30) Foreign Application Priority Data

Oct. 11, 2000 (EP) .............................. 00122040

(51) Int. Cl.⁷ .............................. E01F 9/04; F21V 17/00
(52) U.S. Cl. ..................... 362/153.1; 362/364; 362/374
(58) Field of Search ............... 362/145, 153.1, 362/470, 287, 362, 429, 364, 372, 374

(56) References Cited

U.S. PATENT DOCUMENTS 5,335,151 A * 8/1994 Dahlberg ................. 362/153.1
5,556,189 A   9/1996 Wallis ..................... 362/153.1
5,779,349 A * 7/1998 Reinert, Sr. ............... 362/153.1
6,210,017 B1 * 4/2001 Miura et al. .............. 362/153.1

FOREIGN PATENT DOCUMENTS

| DE | 1183455 | 12/1964 |
| DE | 2060761 | 6/1971 |
| GB | 942296 | 11/1963 |
| GB | 1296900 | 11/1972 |
| WO | 94/15833 | 7/1997 |

* cited by examiner

*Primary Examiner*—Alan Cariaso
(74) *Attorney, Agent, or Firm*—Wenderoth, Lind & Ponack, L.L.P.

(57) ABSTRACT

A marking element for carriageways, comprising a cylindrical housing (18) in which there is arranged at least one light source whose light issues through a flat boundary surface, flush with the carriageway, of a transparent part (2') of the cover (2) of the housing, wherein the light coming from the light source extends in the interior of the cover at an angle with respect to the boundary surface, which is close to the limit angle for total reflection, and wherein the light source is mechanically connected to the cover (2) which can be connected to the housing (1) in different angular positions.

7 Claims, 4 Drawing Sheets

Figure 3:
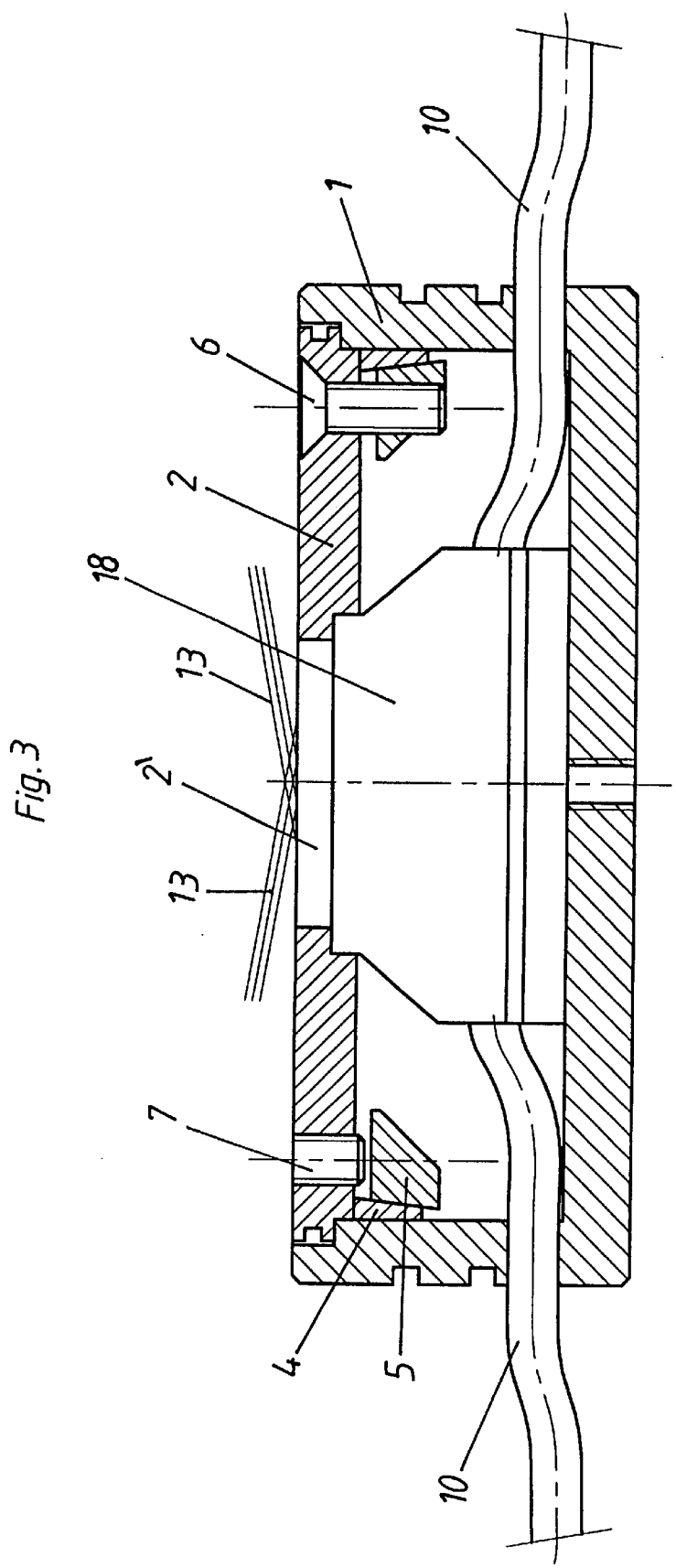

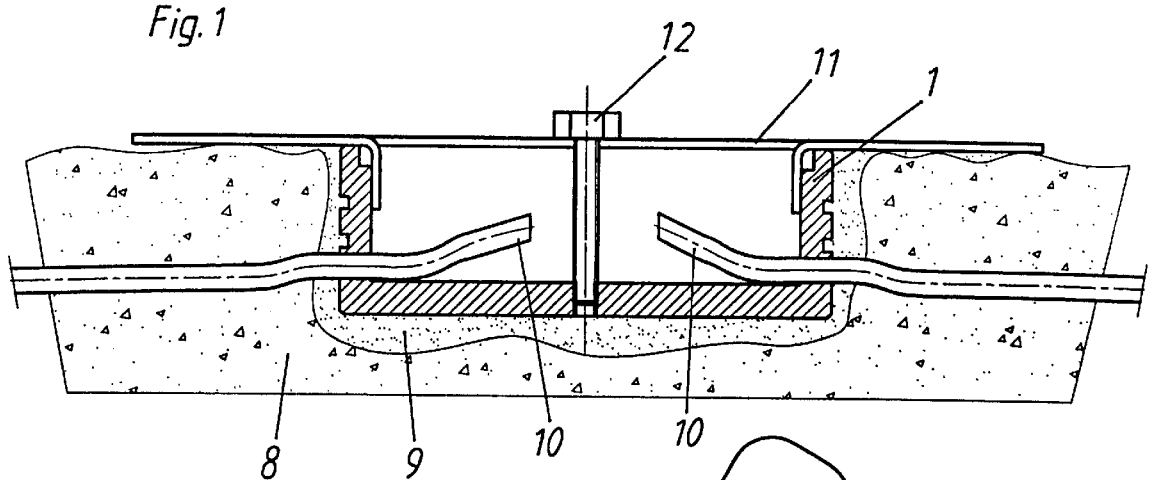
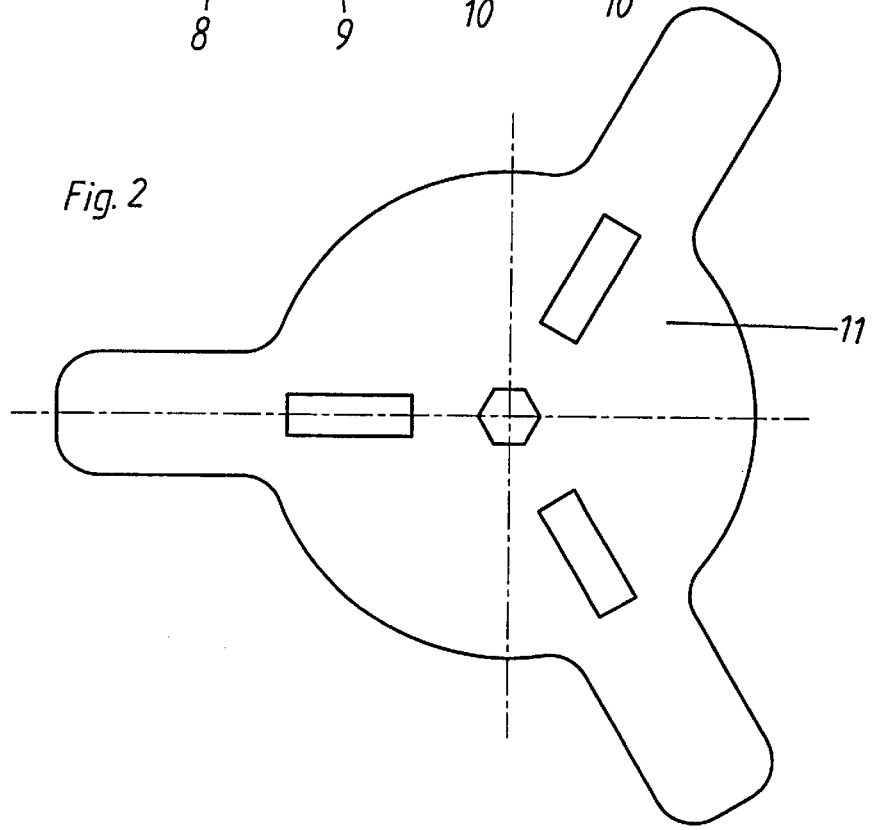

MARKING ELEMENT FOR CARRIAGEWAYS

The invention relates to a marking element for carriageways, comprising a cylindrical housing in which there is arranged at least one light source whose light issues through a flat boundary surface, flush with the carriageway, of a transparent part of the cover of the housing, wherein the light coming from the light source extends in the interior of the cover at an angle with respect to the boundary surface, which is close to the limit angle for total reflection.

In a known arrangement of that kind (see GB 966 357), there are provided light sources which are arranged in a rectangular frame, the irradiation direction being parallel to two sides of the frame. The holder for the light sources is fixedly connected to the housing. The cover which is separate therefrom is to be fixed by means of screws at predetermined bores in the housing in a defined position.

A disadvantage with the known arrangement is that the housing must be entirely precisely installed in order to provide the prescribed irradiation direction. Even if accurate assembly procedures can be presumed to occur, a predetermined installation direction for the housing is often in conflict with the wish to pass power supply cables which come from a given direction straight into the housing.

The invention avoids the above-indicated disadvantages in that the light source is mechanically connected to the cover which can be connected to the housing in different angular positions.

A particularly simple structural configuration of that concept provides that, for releasably connecting the cover and the housing, there are provided conical clamping rings which can be clamped against the inside wall of the housing by screws arranged rotatably in the cover.

The features according to the invention make it possible for the housing to be mounted in any desired angular position, in particular in consideration of easily feeding in the cable, while nonetheless achieving the desired light irradiation direction.

Figure 4:
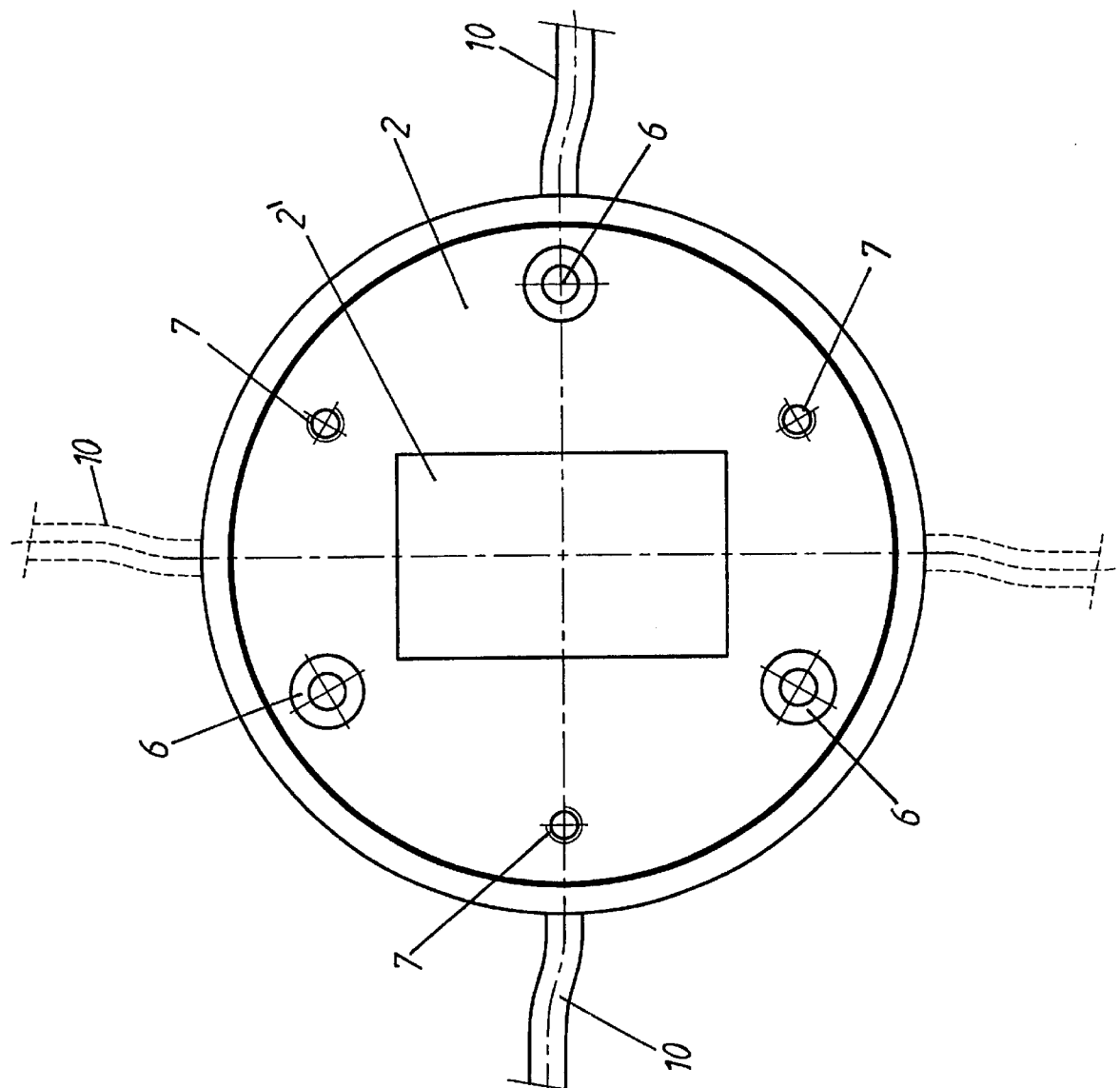
Figure 5:
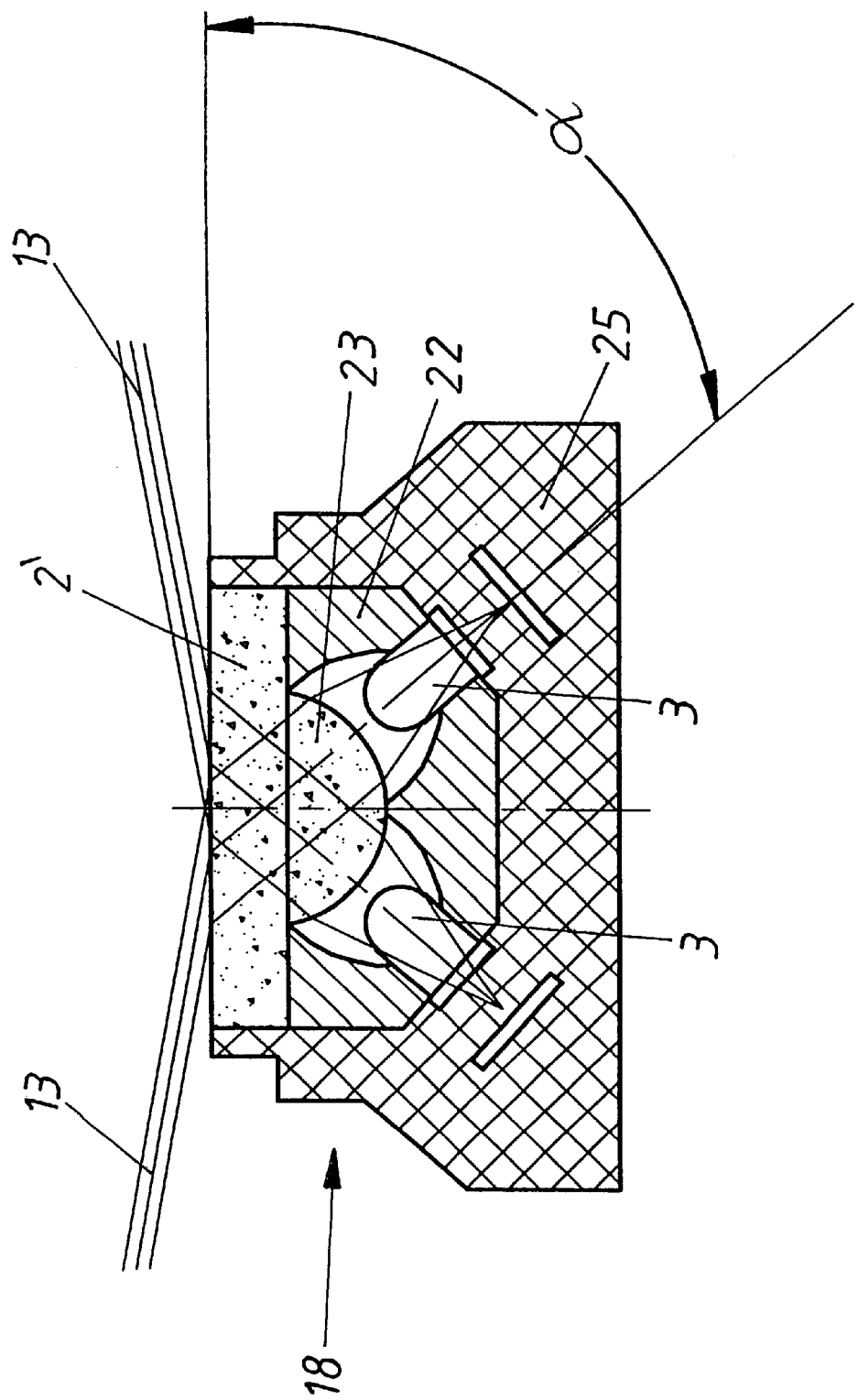

Further details of the invention are described hereinafter with reference to the drawing in which:

FIG. 1 is a view in cross-section through the housing of a marking element during assembly, FIG. 2 is a plan view of the assembly gauge used in FIG. 1, FIG. 3 is a view in cross-section through the finished assembled marking element, FIG. 4 shows the associated plan view, and FIG. 5 shows a view in cross-section through a light element.

For assembly of the marking element according to the invention, a bore 9 is cut into the road surface topping 8, the ends of the cable 10 which is laid in the road surface topping opening into the bore 9. In order to provisionally fix the housing 1, use is made of an assembly gauge 11 in the form of a metal plate which is connected to the housing 1 by means of the screw 12. After the intermediate space which remains between the road surface topping 8 and the housing 1 has been teamed with asphalt the assembly gauge 11 is removed.

Now, as can be seen from FIG. 3, a light element 18 is fitted into the housing, from which light 13 issues very shallowly in two opposite directions. The structure of a light element 18 of that kind can be seen for example from FIG. 5: Light sources 3 in the form of light emitting diodes are held in a reflector housing 2 of aluminium or plastic material. The light which issues at a beam spread angle of about 25° is for the major part rendered parallel by way of the lens 23 of glass or plastic material. The light passes through the cover plate 2' and on issuing into the air is refracted away from the perpendicular in the direction of horizontal emergence. The angle α included between the LED centre line and the horizontal emergence plane is close to the limit angle for total reflection and is determined by the refractive index of the material of the lens and the cover plate. The cover plate 2' can be made both from glass and also from PMMA or polycarbonate. In the case of a plastic design, a scratch-resistant coating or a thin glass laminate is provided. To provide for electrical and climatic sealing integrity, the entire module is cast into an elastomer housing 25 which, besides the insulation function, also has a damping function.

The light element 18 which is of a shape that is rectangular in plan is fixedly connected to the cover 2 or the transparent cover plate 2' of the light element 18 forms a part of the cover 2. Rotation of the cover 2 thus results in a corresponding change in the direction of issue of the light beams 13.

In order to be able to fix the cover 2 in various angular positions, it is fixed by means of conical clamping rings 4, 5 which are braced against the inside wall of the housing 1 by tightening a plurality of screws 6 which are arranged at the periphery.

In order always to be able to open the housing even after several years and in a fouled and corroded condition, a plurality of grub screws 7 which are distributed at the periphery are pressed against the clamping ring 5, after the clamping screws 6 have been released, and they release the clamping ring connection.

As, upon installation of the housings, it must be assumed that both the carriageway properties, the road configuration and also the processing operative has an influence on the definitive position of the knob or button, this system affords the possibility of freely determining the position of the cover and thus the orientation of the emergent light at an angle of +/−180°. This fact also means that the cable can be fed to the assembly from any desired direction and thus a freely selected configuration of light signals along, transversely with respect to or in defined contours on the carriageway is possible.

In order possibly to avoid the cables 10 being excessively severely deflected within the housing 1, two pairs of openings for the cables 10 can be provided at oppositely disposed locations on the housing 1, as indicated in FIG. 4.

What is claimed is:

1. A marking element for carriageways, comprising:
    a cylindrical housing having at least one light source arranged therein such that light therefrom radiates through a flat boundary surface of a transparent part of a cover of said housing, said flat boundary surface adapted to be flush with a carriageway;
    wherein light from said light source radiates inside said cover at an angle, with respect to said boundary surface, that is close to the limit angle for total reflection;
    wherein said light source is mechanically connected to said cover;
    wherein said cover can be connected to said housing in different angular positions; and
    wherein said cover is releasably connected to said housing by conical clamping rings clamped against an inside wall of said housing by screws that are rotatably arranged in said cover.

2. The marking element of claim 1, wherein said cover has grub screws for urging an inner one of said conical clamping rings downwardly.

3. The marking element of claim 1, wherein light from said light source radiates through at least one lens unitarily connected with said cover.

4. The marking element of claim 3, wherein said at least one lens is connected to a reflector housing surrounding said light source.

5. The marking element of claim 4, wherein said at least one lens and said reflector housing are cast in a transparent medium which connects said at least one lens and said reflector to said housing to form a unit.

6. A marking element for carriageways, comprising:

- a cylindrical housing having at least one light source arranged therein such that light therefrom radiates through a flat boundary surface of a transparent part of a cover of said housing, said flat boundary surface adapted to be flush with a carriageway;
- wherein light from said light source radiates inside said cover at an angle, with respect to said boundary surface, that is close to the limit angle for total reflection;
- wherein said light source is mechanically connected to said cover;
- wherein said cover can be connected to said housing in different angular positions;
- wherein said at least one lens is connected to a reflector housing surrounding said light source; and
- wherein said at least one lens and said reflector housing are cast in a transparent medium which connects said at least one lens and said reflector housing to form a unit.

7. A marking element for roadways, comprising:

- a cylindrical housing;
- a cover releasably connected to said housing by conical clamping rings clamped against an inside wall of said housing by screws in said cover, said cover being connectable to said housing in different angular positions, and said cover having a transparent part with a flat boundary surface intended in use to be flush with a roadway; and
- a light source in said cylindrical housing arranged such that light therefrom radiates inside said cover at an angle with respect to said boundary surface close to the limit angle for total reflection and through said flat boundary surface of said transparent part of said cover of said housing, said light source being mechanically connected to said cover.

* * * * *